(12) United States Patent
Svedevall et al.

(10) Patent No.: US 8,547,842 B2
(45) Date of Patent: Oct. 1, 2013

(54) TRANSMIT POWER CONTROL FOR BASE STATIONS USING MULTIPLE CARRIER POWER AMPLIFIERS

(75) Inventors: Sofia Svedevall, Linköping (SE); Benny Lennartson, Hägersten (SE); Torsten Lind, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 285 days.

(21) Appl. No.: 13/202,299

(22) PCT Filed: Sep. 11, 2009

(86) PCT No.: PCT/SE2009/051011
§ 371 (c)(1),
(2), (4) Date: Aug. 18, 2011

(87) PCT Pub. No.: WO2010/095991
PCT Pub. Date: Aug. 26, 2010

(65) Prior Publication Data
US 2011/0305181 A1    Dec. 15, 2011

Related U.S. Application Data

(60) Provisional application No. 61/154,056, filed on Feb. 20, 2009.

(51) Int. Cl.
*G08C 15/00* (2006.01)
*H04L 12/43* (2006.01)
*H04B 7/00* (2006.01)

(52) U.S. Cl.
USPC ........ 370/233; 370/234; 370/458; 455/114.3; 455/127.1; 455/522

(58) Field of Classification Search
None
See application file for complete search history.

(56) References Cited

U.S. PATENT DOCUMENTS

| 6,418,137 | B1 | 7/2002 | Bontu et al. |
| 6,694,148 | B1 | 2/2004 | Frodigh et al. |
| 6,819,934 | B1 | 11/2004 | Truong et al. |
| 2005/0135312 | A1 | 6/2005 | Montojo et al. |
| 2006/0140296 | A1* | 6/2006 | Cleveland et al. ............ 375/260 |
| 2006/0252446 | A1 | 11/2006 | Zhang |

FOREIGN PATENT DOCUMENTS

| EP | 1876725 A2 | 1/2008 |
| WO | 00/21322 | 4/2000 |

OTHER PUBLICATIONS

Wulich, D., "Peak factor in orthogonal multicarrier modulation with variable levels," Electronic Letters, Sep. 26, 1996, vol. 32, No. 20.

* cited by examiner

*Primary Examiner* — Chirag Shah
*Assistant Examiner* — Ashley Shivers
(74) *Attorney, Agent, or Firm* — Coats & Bennett, P.L.L.C.

(57) ABSTRACT

In a method and a device for controlling the output power in a Base Transceiver Station adapted to transmit signals over an air interface using a power amplifier for multiple earners, the power of signals to be transmitted in an upcoming transmission time slot are added and compared to at least one threshold value. If the threshold is exceeded the output power is reduced. By implementing a power reduction scheme as set out above the risk for peak power effects is minimized at the same time as the dimensioning may be aggressive. This is made possible because no power will be backed off unless really needed.

14 Claims, 2 Drawing Sheets

TRANSMIT POWER CONTROL FOR BASE STATIONS USING MULTIPLE CARRIER POWER AMPLIFIERS

TECHNICAL FIELD

The present invention relates to a method and a device for controlling power.

BACKGROUND

In mobile networks when using Multiple Carrier Power Amplifier (MCPA) Radio Base Stations (RBSs) there will be a risk that the available power will not be enough for all information to be sent during a specific time period on a specific frequency.

For shorter periods of time (peaks) there is a certain margin for power overload. But if that margin is exceeded the output signal will be distorted and causing inter modulation (IM) products affecting both transmission on that particular frequency itself and adjacent frequencies.

There are several solutions for how to solve this, with small or large impact to one or several of the users of the MCPA. Furthermore, there are several ways to minimize the risk for power congestion, by power reduction, prediction and spreading of the users to different time slots and frequencies/MCPAs.

In FIG. 1 an exemplary scenario where the peak power allocation is exceeded in a time slot is depicted. Thus, for an MCPA if the combined power required by the multiple carriers exceeds the available power output from the MCPA some action needs to be taken or the signal will be distorted.

For Global System for Mobile Communication (GSM) based MCPA RBSs a major problem is that the power requirements are typically largely determined by the Base Station Controller (BSC), for each MCPA carrier separately. And it is first when the different MCPA carriers are added in the Base Transceiver Station (BTS) that the negative peak effects get visible, as well as the positive effects of discontinuous transmission. At that time the BSC cannot change the power order. As a result there may be an over demand of power for a particular Time Slot (TS).

One of the most difficult tasks is to minimize the power need during the periods when the Slow Associated Control Channel (SACCH) information is to be sent out. The reason is that all ongoing Circuit Switched (CS) connections must transmit at the same time in accordance with Third Generation Partnership Project (3GPP) specification No, 45.002. Furthermore, when using Discontinuous Transmission there are specific periods when all ongoing connections must transmit Silence Detection (SID) frames in accordance with according to 3GPP specification No. 45.008 during periods of silence. This applies to all speech calls using a specific rate and mode namely FR/speech, HR/speech, FR/data or HR/data.

Hence, there exist a need for a method and a system that is able to improve power allocation in transmission of data.

SUMMARY

It is an object of the present invention to overcome or at least reduce some of the problems associated with existing power allocation in a Base Transceiver Station.

This object and others are obtained by the method and the device as set out in the appended claims.

In accordance with the present invention a Base Transceiver Station is adapted to fast reduce output power. In accordance with one embodiment a fast power back-off module adapted to reduce the mean power is provided in the BTS. The mean power can be reduced when some preset condition is met. The power reduction module can be configured to be activated when the ordered mean power exceeds a maximum mean power for an up-coming Time Division Multiple Access (TDMA) frame and timeslot. In accordance with one embodiment the power reduction module can be configured to be activated when the ordered mean power plus the peak exceeds the maximum mean power plus the peak power margin. Also, the peak power can be determined depending on the number of added carriers and the modulation type of the carriers. The power reduction module can further be adapted to reduce power for data signaling given a lower priority, for example being determined to be least vulnerable to a power reduction. Hence, when activating power reduction the power can be reduced for transmission determined to be less vulnerable according to some predetermined prioritization list. For example 8-PSK information can be power reduced during SACCH and/or SID frames.

The invention also extends to a method of controlling power in a BTS in accordance with the above.

BRIEF DESCRIPTION OF THE DRAWINGS

The present invention will now be described in more detail by way of non-limiting examples and with reference to the accompanying drawings, in which.

DETAILED DESCRIPTION

Figure 1:
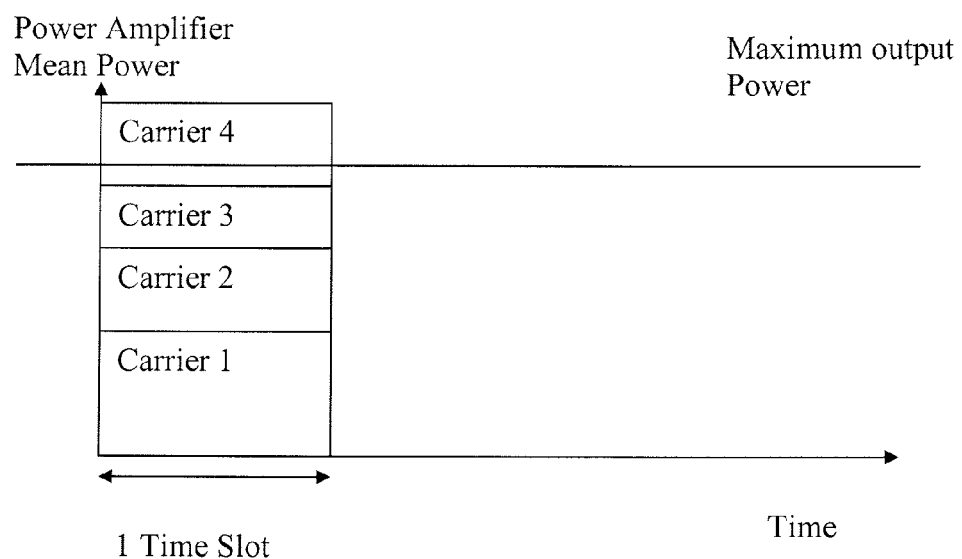
FIG. 1 is a view illustrating exceeded peak power allocation
Figure 2:
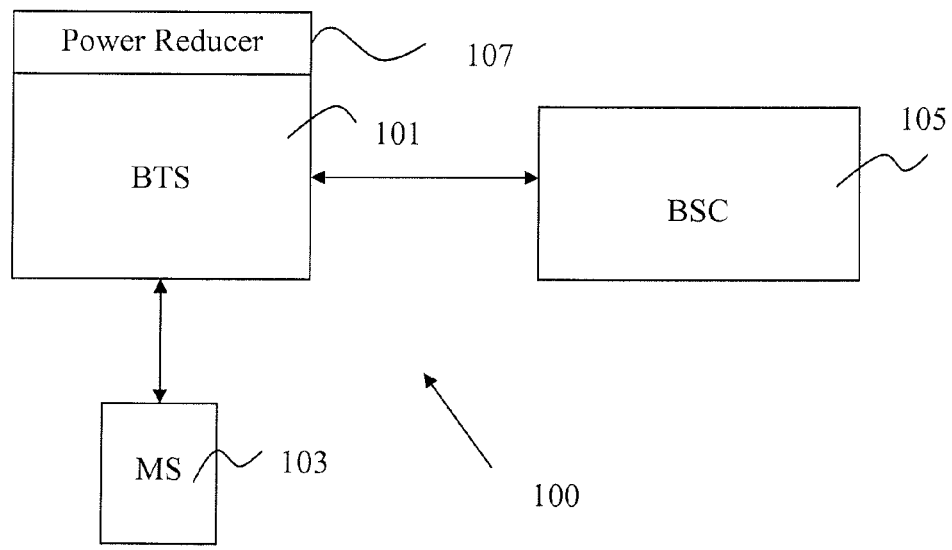
FIG. 2 shows a block diagram illustrating a cellular radio network.

The present invention will now be described in more detail by way of non-limiting examples. In FIG. 2, a cellular radio system 100 such as a GSM system is depicted. FIG. 2 depicts a BTS 101 comprising a power reduction module 107. FIG. 2 further depicts one of possibly many Mobile Stations (MS) 103 communicating with the BTS 101. Also a Base Station Controller (BSC) 105 connected to the BTS is shown.

The BTS 101 comprising a power reducer 107 is adapted to detect the peak effects resulting from adding several signals with equal or different modulation techniques to be transmitted by the BTS.

As soon as the estimated peak power exceeds some predetermined value, such as the maximum mean power plus the peak margin a power back-off is initiated for one or several of the included signals transmitted by the BTS.

The power reduction can be imposed differently for different signals transmitted by the BTS. In accordance with one embodiment the power back-off is performed according to a preconfigured priority scheme, for example:

| CHANNEL TYPE | PRIORITY | MAX BACK-OFF | PENALTY | LONG BACK OFF TIME |
|---|---|---|---|---|
| BCCH-TN0 | 1 (highest) | 2 dB | | |
| BCCH-filling | 6 | 2 dB | After long back-off time rise to prio 4 for 1 s | Back-off applied to >50% of bursts within 2 s |
| SDCCH/8 | 5 | 2 dB | | |
| TCH/HR/non-AMR | 3 | 2 dB | | |
| TCH/HR/AMR | 4 | 2 dB | | |
| TCH/FR/non-AMR | 4 | 2 dB | | |
| TCH/FR/AMR | 5 | 2 dB | | |
| TCH/other | 3 | 2 dB | | |
| SACCH | 3 | 2 dB | After long back-off time rise to prio 2 for 1 s | Back-off applied to >50% of bursts within 2 s |
| FACCH | 2 | 2 dB | After long back-off time rise to prio 1 until message has been acknowledged | Back-off applied to >25% of bursts within 1 s |
| PDCH on C0-GMSK | 6 | 2 dB | After long back-off time rise to prio 4 for 1 s | Back-off applied to >50% of bursts within 2 s |
| PDTCH and PACCH on other carrier-GMSK | 6 | 3 dB | | |
| PTCCH on other carrier-GMSK | 5 | 3 dB | After long back-off time rise to prio 4 for 1 s | Back-off applied to >50% of bursts within 2 s |
| PDCH on any acrrier-8-PSK | 7 (lowest) | 3.3 dB | | |

The back-off priority can in one embodiment be dependent on the time; thereby avoiding that one signal is not backed-off during too long time.

Figure 3:
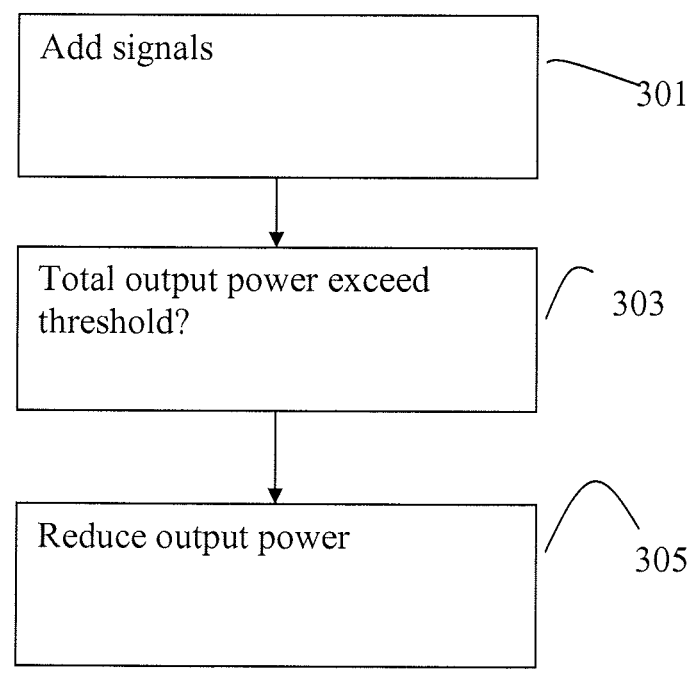
FIG. 3 is a flow chart illustrating some procedural steps performed when controlling the output power in a base transceiver station.

In FIG. 3, a flow chart illustrating some procedural steps performed when controlling power output in a BTS in accordance with the above is shown. First, in a step 301, signals with equal or different modulation techniques to be transmitted by the BTS are added, and the combined output power required to transmit the added signals is calculated. Next, in a step 303, the combined required output power is compared to one or many threshold values. If one or many threshold values are exceeded the mean power is reduced in a step 305.

By implementing a power reduction scheme as set out above the risk for peak power effects is minimized at the same time as the dimensioning may be aggressive. This is made possible because no power will be backed off unless really needed.

The invention claimed is:

1. A method of controlling output power in a Base Transceiver Station configured to transmit signals over an air interface using a power amplifier for multiple carriers, the method comprising:
    adding, by a power reducer device, the power of signals to be transmitted in an upcoming transmission time slot,
    comparing the added signal powers to at least one threshold value, and
    reducing the output power when the added power of signals exceeds the at least one threshold, wherein the power output is reduced when an ordered mean power plus a peak power exceeds a maximum mean power plus a peak power margin.

2. The method according to claim 1, wherein reducing the output power comprises reducing the mean power.

3. The method according to claim 1, wherein the power output is reduced when an ordered mean power exceeds a maximum mean power for an up-coming Time Division Multiple Access (TDMA) frame and timeslot.

4. The method according to claim 1, wherein the peak power is determined depending on the number of added carriers and the modulation type of the carriers.

5. The method according to claim 1, wherein the power output is reduced for signals of a channel type given a low priority.

6. The method according to claim 5, wherein the priority is set for a channel type according to a preconfigured priority scheme.

7. The method according to claim 5, wherein the power output is reduced dependent on time.

8. A Base Transceiver Station for controlling output power, the base transceiver station comprising:
    an air interface configured to:
        transmit signals using a power amplifier for multiple carriers; and
    a power reducer device configured to:
        add the power of signals to be transmitted in an upcoming transmission time slot,
        compare the added signal powers to at least one threshold value, and reduce the output power when the added power of signals exceed the at least one threshold, by reducing the power output when the ordered mean power plus a peak power exceeds a maximum mean power plus a peak power margin.

9. The base transceiver station according to claim 8, wherein the power reducer device is configured to reduce the output power by reducing the mean power.

10. The base transceiver station according to claim 8, wherein the power reducer device is configured to reduce the power output when an ordered mean power exceeds a maximum mean power for an up-coming Time Division Multiple Access (TDMA) frame and timeslot.

11. The base transceiver station according to claim 8, wherein the power reducer device is configured to determine the peak power depending on the number of added carriers and the modulation type of the carriers.

12. The base transceiver station according to claim 8, wherein the power reducer device is configured to reduce the power output for signals of a channel type given a low priority.

13. The base transceiver station according to claim 12, wherein the priority is set for a channel type according to a preconfigured priority scheme.

14. The base transceiver station according to claim 12, wherein the power reducer device is configured to reduce the power output dependent on time.

* * * * *